(12) United States Patent
Zhao et al.

(10) Patent No.: US 7,899,994 B2
(45) Date of Patent: Mar. 1, 2011

(54) PROVIDING QUALITY OF SERVICE (QOS) FOR CACHE ARCHITECTURES USING PRIORITY INFORMATION

(75) Inventors: Li Zhao, Beaverton, OR (US);
Ravishankar Iyer, Portland, OR (US);
Ramesh Illikkal, Portland, OR (US);
Srihari Makineni, Portland, OR (US);
Donald Newell, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 767 days.

(21) Appl. No.: 11/503,633

(22) Filed: Aug. 14, 2006

(65) Prior Publication Data

US 2008/0040554 A1 Feb. 14, 2008

(51) Int. Cl.
*G06F 13/00* (2006.01)
(52) U.S. Cl. ............... 711/133; 711/134; 711/135; 711/151; 711/158; 711/159
(58) Field of Classification Search ......... 711/133–135, 711/151, 158–159
See application file for complete search history.

(56) References Cited

U.S. PATENT DOCUMENTS 5,943,687 A * 8/1999 Liedberg ............... 711/156
6,292,871 B1 * 9/2001 Fuente ................. 711/136
7,242,692 B2 * 7/2007 Wu et al. .............. 370/414
2004/0260880 A1 12/2004 Shannon et al. ......... 711/122
2005/0114605 A1 * 5/2005 Iyer ..................... 711/133

OTHER PUBLICATIONS

U.S. Appl. No. 11/087,916, filed Mar. 22, 2005, entitled "A Cache Eviction Technique For Reducing Cache Eviction Traffic" by Christopher J. Shannon, et al.
U.S. Appl. No. 10/897,474, filed Jul. 23, 2004, entitled "A Cache Eviction Technique for Inclusive Cache Systems" by Christopher J. Shannon, et al.
U.S. Appl. No. 11/374,222, filed Mar. 13, 2006, entitled "Synchronizing Recency Information In An Inclusive Cache Hierarchy" by Christopher J. Shannon, et al.
U.S. Appl. No. 11/503,777, filed Aug. 14, 2006, entitled, "A Selectively Inclusive Cache Architecture," by Ravishankar Iyer, Li Zhao, Srihari Makineni and Donald Newell.
U.S. Appl. No. 11/513,554, filed Aug. 31, 2006, entitled, "Selective Storage Of Data In Levels Of A Cache Memory," by Srihari Makineni, Jaideep Moses, Ravishankar Iyer, Ramesh Illikkal, Donald Newell and Li Zhao.

* cited by examiner

*Primary Examiner*—Jasmine Song
(74) *Attorney, Agent, or Firm*—Trop, Pruner & Hu, P.C.

(57) ABSTRACT

In one embodiment, the present invention includes a method for associating a first priority indicator with first data stored in a first entry of a cache memory to indicate a priority level of the first data, and updating a count value associated with the first priority indicator. The count value may then be used in determining an appropriate cache line for eviction. Other embodiments are described and claimed.

21 Claims, 4 Drawing Sheets

… (1) …

PROVIDING QUALITY OF SERVICE (QOS) FOR CACHE ARCHITECTURES USING PRIORITY INFORMATION

BACKGROUND

Chip multiprocessors (CMPs) that include multiple processing cores on a single die can improve system performance. Such CMPs and other multiprocessor systems may be used for highly-threaded (or parallel) applications and to support throughput computing. Particularly in situations where multiple cores and/or threads share one or more levels of a cache hierarchy, difficulties can arise. For example, in some systems, multiple levels of cache memory may be implemented as an inclusive cache hierarchy. In an inclusive cache hierarchy, one of the cache memories (i.e., a lower-level cache memory) may include a subset of data contained in another cache memory (i.e., an upper-level cache memory). Because inclusive cache hierarchies store some common data, eviction of a cache line in one cache level can cause a corresponding cache line eviction in another level of the cache hierarchy to maintain cache coherency. More specifically, an eviction in a higher-level cache causes an eviction in a lower-level cache.

Cache lines in a higher-level cache may be evicted as being stale, although a corresponding copy of that cache line in a lower-level cache may be heavily accessed by an associated core, which may lead to unnecessary cache misses. These cache misses may require significant latencies to obtain valid data from other memory locations, such as a main memory. Thus problems can occur when an inclusive cache hierarchy has a higher-level cache that is shared among multiple processors, for example, multiple cores of a multi-core processor. In this scenario, each core occupies at least some cache lines in the higher-level cache, but all cores contend for the shared resource. When one of the cores uses a small working set which fits inside its lower-level cache, this core rarely (if ever) would have to send requests to the higher-level cache since the requests hit in its lower-level cache. As a result, this core's lines in the higher-level cache may become stale without regard as to how often the core uses them. When sharing the higher-level cache with other cores that continually allocate cache lines into the higher-level cache, this core's data may be evicted, causing performance degradation.

Thus in such a cache hierarchy, fairness and pollution issues can be commonplace due to inter-thread thrashing, high degrees of prefetching, or the existence of streaming data. In addition, when multiple applications are simultaneously running on a multi-core platform, they may have disparate requirements on the cache space and interfere with each other. As one example, the emergence of virtualization as a mechanism to consolidate multiple disparate workloads on the same platform can create cache utilization issues.

DETAILED DESCRIPTION

Figure 1:
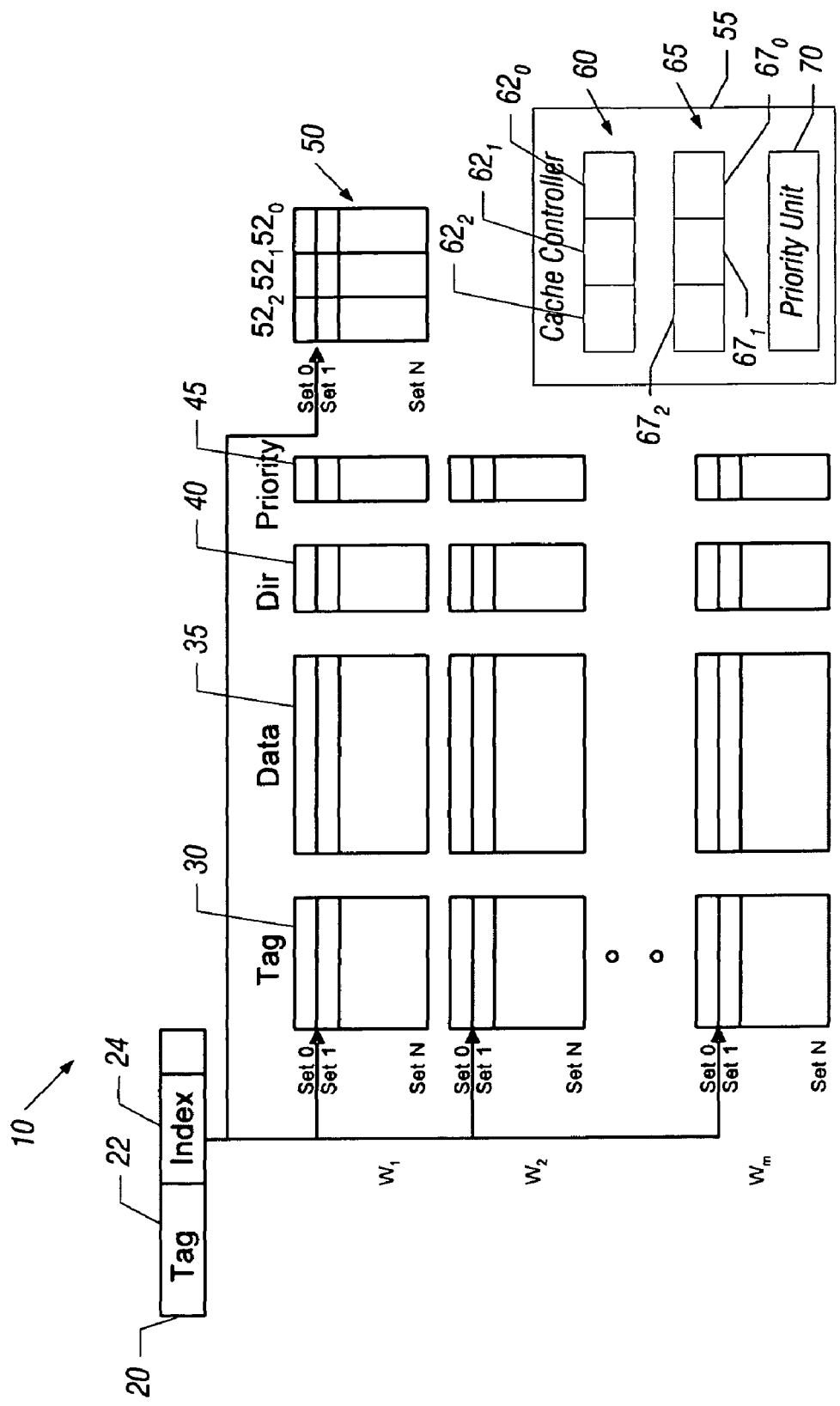
FIG. 1 is a block diagram of a cache memory in accordance with one embodiment of the present invention.

Embodiments of the present invention relate to storage of data and more particularly to storage in a cache memory.

In various embodiments, quality of service (QoS) mechanisms may be implemented to enable improved cache operation. Data to be stored in such a cache may be identified with priority information to indicate priority of the data. This priority information may be stored with the data and further may be used to enable various replacement policies to enforce a desired QoS. In various embodiments, priority information may correspond to a priority of a thread, process, and/or core with which the data is associated. Priority information may be stored in a priority array of a cache, in some embodiments. Furthermore, based upon the priority information, an additional array, e.g., of counters, may be updated to indicate an actual percentage of the cache that is filled with data of a given priority level.

In different embodiments, the QoS mechanisms may have support enabled in an operating system (OS), a virtual machine monitor (VMM) if present, and/or application software. Furthermore, using the priority information present in the cache, a counter-based replacement policy may be used to support QoS mechanisms in shared caches, such as present in large-scale chip multiprocessor (LCMP) or other multiprocessor platforms. Embodiments may be used to both enforce fairness and allow prioritization of workloads. That is, in various embodiments, memory access priorities may guide cache space allocation.

To enable a cache to perform counter-based analyses, a mapping table or other structure may be present for priority-based cache space thresholds so that a cache in accordance with an embodiment may be configured to implement QoS mechanisms. When data is provided to the cache, the cache may receive an indication of how the memory accesses are to be treated. In one implementation, each memory access may be assigned to a priority level (e.g., four priority levels from 0 to 3, where 0 is the highest priority). Assigning memory accesses to priority levels can be accomplished by either using OS-given thread priority or a user-defined priority scheme. As an example, a user or OS can assign a high priority to a user application thread and a lower priority to a thread that belongs to a background process (e.g., a virus scanning thread). Since different priorities can be associated with each memory access, they can be treated differently. The priority levels thus establish relative importance of associated data as compared to other data, rather than an indication of the state of the data or other such criteria.

In one embodiment, priorities may be mapped to a percentage of space allocated to each priority level. As such, each priority level can be assigned a cache space threshold. This priority assignment (i.e., mapping of priority levels to space thresholds) may be maintained in hardware such as a register set in a cache controller, in one embodiment. Note that priority assignments can be managed in the hardware (e.g., configured statically at boot time or through dynamic profiling) or exposed to OS and application via an instruction (e.g., prilevel <prinum> <space or % cache>, which associates a privilege level with a given threshold value).

Priority information and counters for each priority level may be used to manage priority in the cache. In one embodiment, a priority indicator may be included in each cache line, one or more counters may be present for each set in the cache, and one or more counters included for the entire cache. Note that the number of bits in a priority indicator may depend on the number of priority levels that a given system supports. For example, two bits can be used to support four levels of priorities.

When a line is allocated in the cache, its priority level is also stored into the priority array. For each set, a counter may be updated to indicate how many lines are allocated to that priority level. As an example, assume an implementation with four counters for four priorities. The size of each counter depends on the associativity of the cache. Assuming a cache having a 24-way associativity, 5 bits may be used for each counter so the total counter space for each set is 20 bits. The cache level counters may similarly depend on the number of the cache lines. For example, a cache with 24 megabytes (MB) and 64 bytes of cache line size uses 19 bits for each counter.

Replacement policies in accordance with an embodiment may use priority indicators and associated priority thresholds to enforce QoS. As one example, assume cache space allocation is limited in terms of the percentage of the total cache size, and that the priority assignment supports three priorities: priority 0 is the highest and can consume all the cache space; priority 1 can consume at most 50%, and priority 2 can consume up to 10%.

Different mechanisms may be used to realize the prioritization. In one embodiment, cache space may be allocated at the cache level. For example, assuming that the cache is 24 MB with 64 bytes of line size, the thresholds may be initialized as 393216, 196608 and 39321 for priority 0 (100%), 1 (50%) and 2 (10%) respectively. When a new cache line is to be allocated, the three counters for the entire cache may be checked against the thresholds to find an appropriate entry for allocation/replacement. If all counters are below the limit, a given replacement policy (e.g., a least recently used (LRU) policy) is used to find the replacement cache line no matter what priority it is. If some priority exceeds the threshold, a cache line from that priority level will be replaced. For example, if the new line is priority 0 and the counter for priority 2 is beyond the limit, all cache lines from priority 2 will be searched and the least recently used line will be replaced. The counter for the replacement line's priority is decremented by one and the counter for the new line's priority is incremented by one.

In other embodiments, cache space allocation may be at the set level. For example, assuming set associativity is 24, the set level thresholds may be initialized as 24, 12 and 3 (100%, 50% and 10%), respectively. When a new cache line is to be allocated, instead of checking the counters for the entire cache, the three counters for its corresponding set may be checked to find an appropriate entry to replace.

While cache level priority maintains the cache space allocation at a coarse level, it may not be the case in each set. For example, assume a set is consumed by 70% of priority 0, 30% of priority 1 and no priority 2. If a new line is in priority 2, and priority 2 for the entire cache already exceeds its threshold, space cannot be allocated for this line. In these instances, set level priority can avoid non-allocation by looking at counters for each set instead of the entire cache, and allocating space for this lower priority line. However various sets may be accessed differently for each priority, therefore the total cache size consumption will be different from user definition. These two mechanisms can be used together and dynamically exchanged, in some embodiments.

Referring now to FIG. 1, shown is a block diagram of a cache memory in accordance with one embodiment of the present invention. As shown in FIG. 1, cache memory 10, which may be a private cache or a shared cache such as a last level cache (LLC) or another shared cache, may be arranged according to a desired mechanism. For example, in some implementations, cache memory 10 may be arranged in an M-way N-set manner. Thus as shown in FIG. 1, cache memory 10 may include sets $Set_0$-$Set_N$. Furthermore, each set may include ways $W_1$-$W_M$. While shown as an M-way N-set associative cache, is to be understood that the scope of the present invention is not limited in this regard.

Still referring to FIG. 1, each cache line (i.e., corresponding to a given set) or entry may include a tag portion 30, a data portion 35, a directory portion 40, and a priority portion 45. These different portions or fields may be used to store different types of information. In various embodiments, tag portion 30 may be used to index into the cache, while data portion 35 holds the data of the cache line. Directory portion 40 may be used to indicate one or more private caches that include a copy of data (in instances in which cache memory 10 is a shared cache). Priority portion 45 may be a priority indicator associated with the data in data portion 35. More specifically, priority portion 45 may include a priority indicator that indicates a priority level of the thread, process, core or other basis used to identify priority. In various embodiments, priority may be established by a user. Alternately, priority may be established based on an OS mechanism.

To access entries in cache memory 10, an address 20 may be used. As shown in FIG. 1, specifically a tag portion 22 and an index portion 24 of address 20 may be used to access both a given way and set of cache memory 10. Note further that when accessing a set, so too will a corresponding set in a counter array 50 be accessed. Counter array 50 may include entries for each set. Specifically as shown in the embodiment of FIG. 1, each $Set_0$-$Set_N$ includes storage for three counters, namely counters $52_0$-$52_2$ (generically counter 52). While shown as including a collection of counters for each set, in other implementations multiple sets may be associated with a single group of counters, depending upon space constraints in a given implementation.

In various embodiments, when a given set is allocated with data, a corresponding counter 52 associated with that set is updated accordingly. For example, in the embodiment of FIG. 1, three counters are present, indicating that there may be three corresponding priority levels. If data of a first priority level is to be written into a selected set, the corresponding counter 52 in counter array 50 for that set may be updated accordingly. In this way, counters 52 in counter array 50 maintain an accurate count of the number of entries within each set of given priority levels. This information (i.e., the count information present in counter array 50) may be used in connection with replacement policies. More specifically, a given cache line may be selected for replacement using, in part, information associated with the priority levels as set forth in counter array 50.

As further shown in FIG. 1, a cache controller 55 may be present. Cache controller 55 may be used to control searching, storing, accessing, and eviction activities within cache memory 10. In the embodiment of FIG. 1, cache controller 55 may further include a cache-level counter array 60. In various embodiments, cache-level counter array 60 may include an overall count of lines within cache memory 10 associated with different priority levels. In the embodiment of FIG. 1, three such counters, namely counters $62_0$-$62_2$ (generically counter 62) may be present. Furthermore, cache controller 55 may include a threshold storage 65. Threshold storage 65 may include a plurality of threshold registers $67_0$-$67_2$ (generically threshold register 67). Such threshold registers 67 each may include a predetermined threshold level. These threshold levels may correspond to an amount of cache memory 10 that may be consumed by data of a given priority level. In various embodiments, cache space allocation may be limited in terms of the percentage of the total cache size. Accordingly, threshold registers 67 may be initialized with a value that corresponds to a given percentage for its associated priority level. As further shown in FIG. 1, cache controller 55 further includes a priority unit 70. Priority unit 70 may be used to determine, at replacement time, which line should be selected for replacement based at least in part on priority information. While shown with this particular implementation in the embodiment of FIG. 1, it is to be understood that the scope of the present invention is not limited in this regard and in other embodiments, different configurations of a cache memory may be realized.

Figure 2:
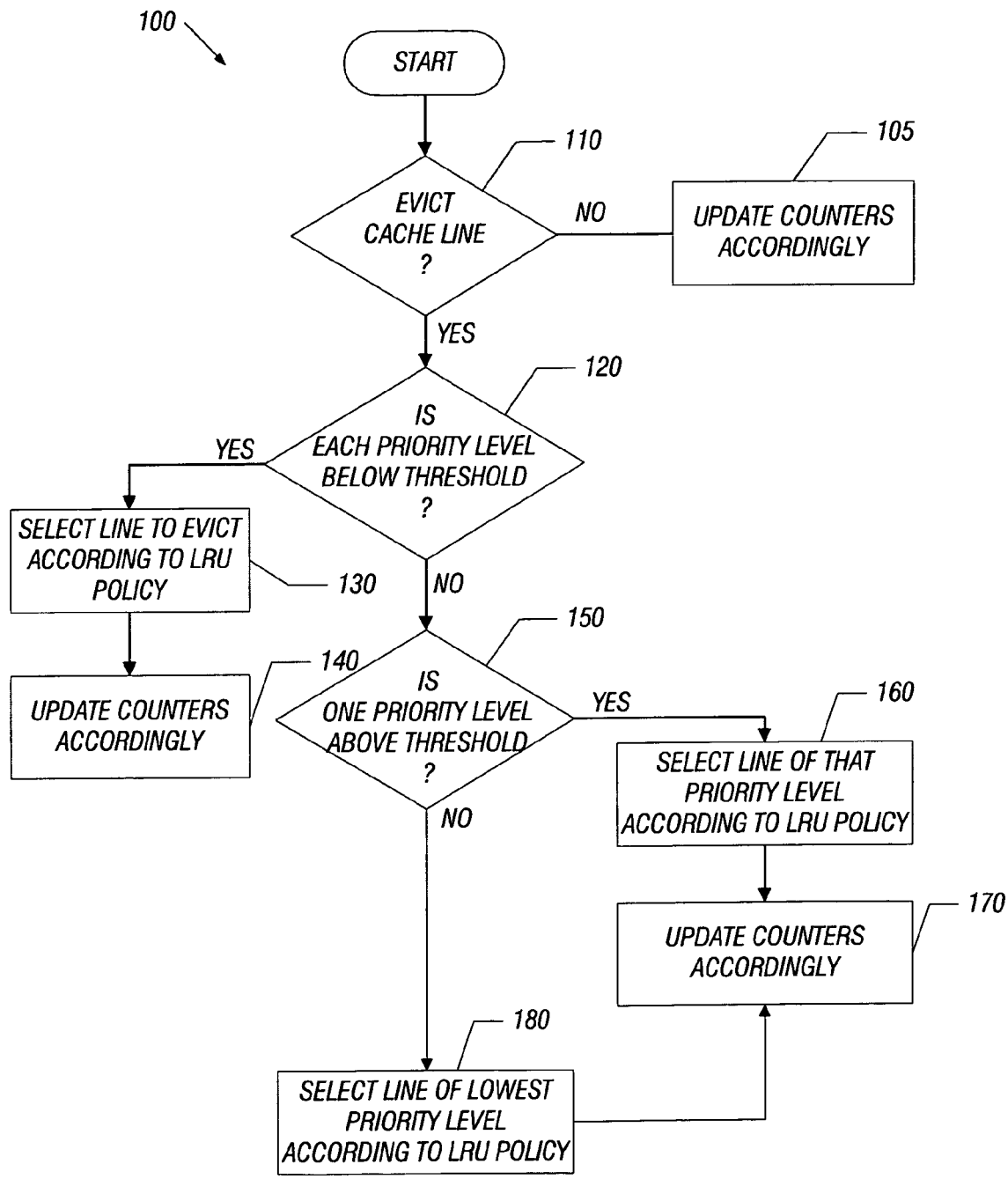
FIG. 2 is a flow diagram of a method in accordance with an embodiment of the present invention.

As described above, in various embodiments priority information present in a cache memory may be used in connection with determining an appropriate entry for replacement. Referring now to FIG. 2, shown is a flow diagram of a method in accordance with an embodiment of the present invention. As shown in FIG. 2, method 100 may begin by determining whether a cache line is to be evicted (diamond 110). For example, such a determination may occur when data is to be allocated into a cache and no empty space is present in the cache. If space is available and no line is to be evicted, diamond 110 may pass control to block 105, where a counter associated with the priority level of the inserted data may be updated (for example, both local and global counters). If it is instead determined that a cache line is to be evicted, control passes to diamond 120. There, it may be determined whether each of multiple priority levels is below a predetermined threshold for the level (diamond 120). That is, multiple priority levels may exist. For ease of discussion, assume that three such priority levels exist. The determination in diamond 120 thus inquires as to whether the number of actual cache lines in the cache for each of the priority levels is below a predetermined threshold for the given level. Note that the determination made in diamond 120 may be at different granularity levels in different embodiments. For example, in some embodiments only an overall cache-level analysis may be performed, while in other embodiments a set-based analysis (or other segmentation strategy) may be performed. Furthermore, as described below in some implementations combinations of these mechanisms may be realized.

In any event, if it is determined that each priority level is below its threshold, control passes to block 130. There, a cache line may be selected for eviction according to a desired replacement policy (block 130). For example, in many implementations a least recently used (LRU) policy may be implemented such that the oldest cache line may be selected for replacement. Upon replacement, the counters that were analyzed in diamond 120 may be updated accordingly (block 140). For example, if the evicted cache line was of priority level 0 and the newly allocated cache line was of priority level 1, the corresponding priority level 0 counter may be decremented and the priority level 1 counter may be incremented.

Referring still to FIG. 2, if instead at diamond 120 it is determined that each priority level is not below its threshold, control passes to diamond 150. At diamond 150, it may be determined if only a single priority level is above its threshold (diamond 150). If so, control passes to block 160. At block 160, a cache line of the priority level that is exceeding its threshold may be selected for replacement, e.g., according to an LRU policy (block 160). Then the counters may be updated accordingly (block 170).

If instead at diamond 150 it is determined that multiple priority levels are above their thresholds, control passes to block 180. At block 180, a line of the lowest priority level (that exceeds its threshold) may be selected for replacement, e.g., according to an LRU policy (block 180). Then, control passes to block 170, discussed above. While described with this particular implementation in the embodiment of FIG. 2, it is to be understood that the scope of the present invention is not limited in this manner.

Figure 3:
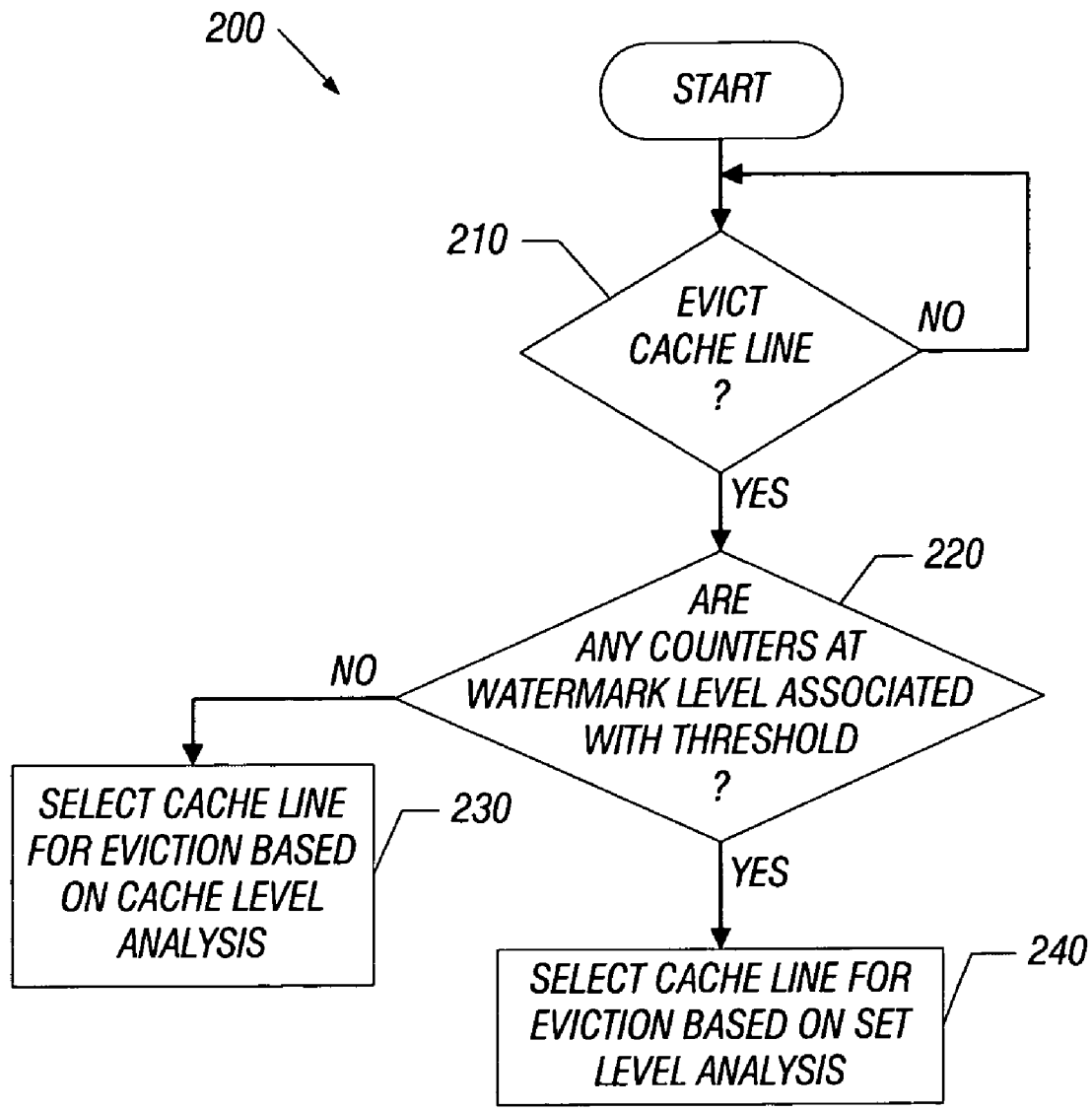
FIG. 3 is a flow diagram of a replacement policy in accordance with an embodiment of the present invention.

As described above, in some embodiments a combination of different granularities of counters may be analyzed in connection with replacement activities. Referring now to FIG. 3, shown is a flow diagram of a replacement policy in accordance with an embodiment of the present invention. As shown in FIG. 3, method 200 may begin by determining whether eviction of a cache line is needed (diamond 210). If so, control passes to diamond 220, otherwise diamond 210 loops back on itself. At diamond 220, it may be determined whether any counters are at or above a watermark level associated with its threshold. That is, cache-level based counters may be analyzed to determine whether any of them are nearing their predetermined threshold (i.e., are within a predetermined amount away from their threshold). For example, in some embodiments a watermark level may correspond to approximately 80% of a threshold level, however, the scope of the present invention is not limited in this regard. If none of the cache-level counters are at their watermark level, control passes to block 230. At block 230, a cache line may be selected for eviction based on a cache-level analysis. For example, as described above with regard to FIG. 2, cache-level based counters may be used to determine an appropriate line for eviction.

Referring still to FIG. 3, if instead at diamond 220 it is determined that at least one of the cache-level counters is at its watermark level, control passes to block 240. At block 240, a cache line may be selected for eviction based on a set-level analysis. Accordingly, a set-level analysis may be performed for a given set to which incoming data is to be allocated. In various embodiments, such set-level based analysis may allow for finer granularity of replacement policies. Of course, while shown with this implementation in the embodiment of FIG. 3, the scope of the present invention is not so limited.

Figure 4:
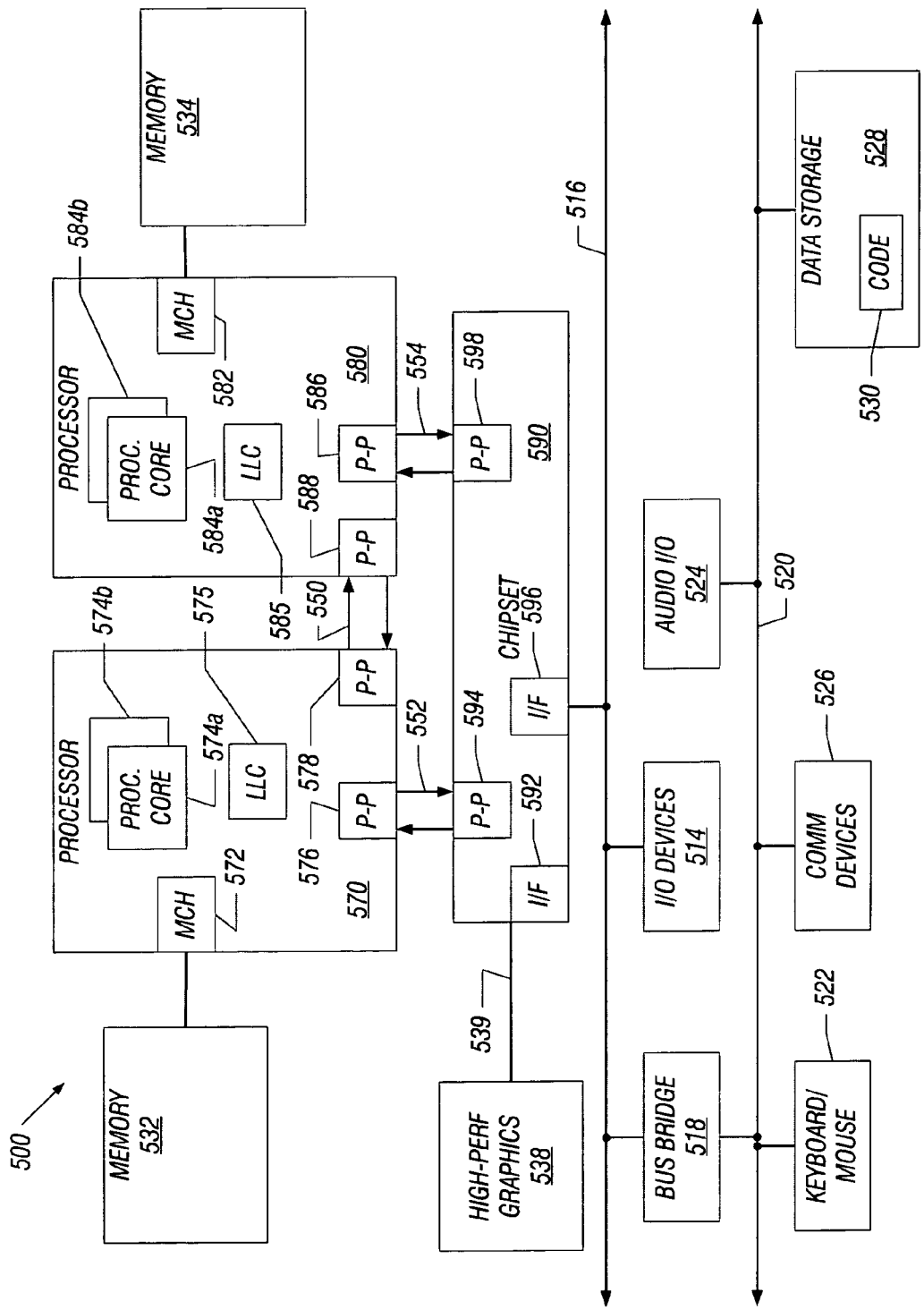
FIG. 4 is a block diagram of a multiprocessor system in accordance with an embodiment of the present invention.

Embodiments may be suited for large-scale CMP platforms, where the cache space allocation is controlled by hardware to realize fairness and reduce pollution; however, embodiments may be implemented in many different system types. Referring now to FIG. 4, shown is a block diagram of a multiprocessor system in accordance with an embodiment of the present invention. As shown in FIG. 4, multiprocessor system 500 is a point-to-point interconnect system, and includes a first processor 570 and a second processor 580 coupled via a point-to-point interconnect 550. However, in other embodiments the multiprocessor system may be of another bus architecture, such as a multi-drop bus or another such implementation. As shown in FIG. 4, each of processors 570 and 580 may be multi-core processors including first and second processor cores (i.e., processor cores 574a and 574b and processor cores 584a and 584b), although other cores and potentially many more other cores may be present in particular embodiments. While not shown in the embodiment of FIG. 4, is to be understood that the first and second processor cores may each include one or more cache memories. Furthermore, as shown in FIG. 4 a last-level cache memory 575 and 585 may be coupled to each pair of processor cores 574a and 574b and 584a and 584b, respectively. To improve performance in such an architecture, a cache controller or other control logic within processors 570 and 580 may enable LLC's 575 and 585 to perform replacement activities using a counter-based analysis, as described above.

Still referring to FIG. 4, first processor 570 further includes a memory controller hub (MCH) 572 and point-to-point (P-P) interfaces 576 and 578. Similarly, second processor 580 includes a MCH 582 and P-P interfaces 586 and 588. As shown in FIG. 4, MCH's 572 and 582 couple the processors to respective memories, namely a memory 532 and a memory 534, which may be portions of main memory (e.g., a dynamic random access memory (DRAM)) locally attached to the respective processors.

First processor 570 and second processor 580 may be coupled to a chipset 590 via P-P interconnects 552 and 554, respectively. As shown in FIG. 4, chipset 590 includes P-P interfaces 594 and 598. Furthermore, chipset 590 includes an interface 592 to couple chipset 590 with a high performance graphics engine 538. In one embodiment, an Advanced Graphics Port (AGP) bus 539 may be used to couple graphics engine 538 to chipset 590. AGP bus 539 may conform to the Accelerated Graphics Port Interface Specification, Revision 2.0, published May 4, 1998, by Intel Corporation, Santa Clara, Calif. Alternately, a point-to-point interconnect 539 may couple these components.

In turn, chipset 590 may be coupled to a first bus 516 via an interface 596. In one embodiment, first bus 516 may be a Peripheral Component Interconnect (PCI) bus, as defined by the PCI Local Bus Specification, Production Version, Revision 2.1, dated June 1995 or a bus such as the PCI Express bus or another third generation input/output (I/O) interconnect bus, although the scope of the present invention is not so limited.

As shown in FIG. 4, various I/O devices 514 may be coupled to first bus 516, along with a bus bridge 518 which couples first bus 516 to a second bus 520. In one embodiment, second bus 520 may be a low pin count (LPC) bus. Various devices may be coupled to second bus 520 including, for example, a keyboard/mouse 522, communication devices 526 and a data storage unit 528 which may include code 530, in one embodiment. Further, an audio I/O 524 may be coupled to second bus 520.

Embodiments may be implemented in code and may be stored on a storage medium having stored thereon instructions which can be used to program a system to perform the instructions. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
    associating a first priority indicator with first data stored in a first entry of a cache memory to indicate a priority level of a process with which the first data is associated, the first priority indicator also stored in the first entry; and
    updating a count value associated with the first priority indicator, the count value stored in a counter array of the cache memory, and selecting data of the first priority level for eviction if the count value associated with the first priority level exceeds a threshold value.

2. The method of claim 1, wherein updating the count value comprises updating a counter of the counter array indicative of a number of entries in the cache memory having the same priority level as the first data.

3. The method of claim 1, wherein updating the count value comprises updating a counter of the counter array indicative of a number of entries in a portion of the cache memory having the same priority level as the first data.

4. The method of claim 1, further comprising determining whether to replace a data element having the same priority level as the first data based at least in part on the count value stored in the counter array.

5. The method of claim 4, further comprising selecting the data element having the same priority level as the first data for replacement if the count value is over a threshold.

6. The method of claim 5, further comprising selecting a data element associated with a second process and associated with a second priority indicator for replacement, wherein a count value stored in the counter array of the cache memory associated with the second priority indicator exceeds a corresponding threshold, and the count value associated with the first priority indicator is below the threshold value, and wherein the second priority indicator is of a higher priority level than the first priority indicator.

7. An apparatus comprising:
    a cache memory having a plurality of storage locations, each of the storage locations including a data field to store data and a priority indicator field to store a priority level associated with the data stored in the data field of the storage location, the priority indicator corresponding to a priority of a thread with which the data is associated; and
    a cache controller to select data of a first priority level for eviction if a counter associated with the first priority level exceeds a threshold value for the first priority level.

8. The apparatus of claim 7, further comprising:
    a plurality of cache level counters each associated with a different priority level; and
    a plurality of set level counters each associated with a different priority level.

9. The apparatus of claim 8, wherein the cache memory is to select a storage location for replacement based at least in part on a value of a cache level counter or a set level counter associated with the priority level of the storage location to be replaced.

10. The apparatus of claim 7, further comprising a counter array including a plurality of counters, each of the plurality of counters to include a count of a number of storage locations in the cache memory having data of a priority level associated with the counter.

11. The apparatus of claim 10, wherein the plurality of counters comprises a plurality of counter groups, each of the counter groups including counters for each of multiple priority levels of data to be stored in a corresponding portion of the cache memory.

12. The apparatus of claim 11, wherein the cache memory is to determine if any of the plurality of counters have reached a watermark level at a selected distance from a threshold for the associated counter.

13. The apparatus of claim 12, wherein the cache memory is to select a storage location for replacement using a counter of a counter group associated with the priority level that has reached the watermark level.

14. The apparatus of claim 10, further comprising a threshold storage to store threshold values for each of the priority levels.

15. The apparatus of claim 7, wherein data of a user thread is to be assigned the first priority level and data of a background thread is to be assigned a second priority level.

16. An article comprising a machine readable storage medium including instructions that when executed by a machine enable the machine to perform a method comprising:
   determining if any of a plurality of counters indicating an amount of a cache memory consumed with data of a corresponding priority level exceeds a threshold level;
   if so, selecting data of the priority level having the counter that exceeds the threshold level for replacement; and
   allocating new data of a lower priority level than the priority level of the data selected for replacement into a set if a set-level counter associated with the lower priority level does not exceed the threshold level, wherein a cache-level counter associated with the lower priority level exceeds the threshold level.

17. The article of claim 16, wherein the method further comprises associating each of the priority levels with a different threshold level, based on a priority of a process with which the data is associated.

18. A system comprising:
   a cache memory including storage elements to store data of multiple processes, wherein each of the multiple processes has a priority level associated therewith, each of the storage elements including a priority indicator field to store the priority level for the data to be stored in a data field of the storage element, the cache memory further including a first counter array having a plurality of first counters each to store a count of the number of storage elements in a set of the cache memory having data associated with a given priority level;
   a cache controller coupled to the cache memory to maintain a measure of an amount of the cache memory consumed by each of the priority levels, the cache controller including a second counter array to store a plurality of second counters to store a count of the number of storage elements in the cache memory having data associated with a given priority level, wherein the cache controller is to select a storage element having data of a first priority level for eviction, wherein the first counter associated with the first priority level exceeds a threshold value; and
   a dynamic random access memory (DRAM) coupled to the cache memory.

19. The system of claim 18, wherein the cache controller is to select a storage element for replacement based at least in part on the counts in the first counter array or the second counter array.

20. The system of claim 18, wherein the cache controller is to allocate new data of a lower priority level than the first priority level into a set of the cache memory, wherein the set has a corresponding first counter for the lower priority level that is below a set level threshold value.

21. The system of claim 20, wherein the cache controller is to evict data of a higher priority level than the lower priority level from the set of the cache memory to allocate the new data, wherein a cache level counter associated with the lower priority level exceeds a cache level threshold value.

* * * * *